March 28, 1939.   V. W. KLIESRATH   2,152,061
CLUTCH CONTROL
Original Filed April 23, 1936

INVENTOR
VICTOR W. KLIESRATH
BY
H. O. Clayton
ATTORNEY

Patented Mar. 28, 1939

2,152,061

UNITED STATES PATENT OFFICE 2,152,061

CLUTCH CONTROL

Victor W. Kliesrath, South Bend, Ind., assignor to Bragg-Kliesrath Corporation, South Bend, Ind., a corporation of New York Original application April 23, 1936, Serial No. 76,031. Divided and this application February 3, 1937, Serial No. 123,747

1 Claim. (Cl. 74—471)

This invention relates in general to control mechanism and in particular to a mechanism for effecting a joint operation of the conventional change-speed transmission and clutch of an automotive vehicle.

The invention also contemplates the provision of an easily fabricated and assembled cheap type of control device for effecting any one of a selective, intermittent, successive or concurrent operation of two control mechanisms.

The most important object of the invention is to provide a simple and compact control device mounted on the end of a manually operable control member, such as the gear shift lever of an automotive vehicle, said control device preferably comprising two relatively movable members urged apart by yieldable means.

Other objects of the invention and desirable details of construction will become apparent from the following detailed description of a preferred embodiment of my invention, taken in conjunction with the accompanying drawing, in which.

The control mechanism of my invention is of particular utility in effecting the operation of the clutch and change-speed transmission of an automotive vehicle. As disclosed in Figure 1, a lever 10, extending from the floor 12 of the driver's compartment, serves in the conventional manner to operate a conventional three-speeds forward and reverse transmission, not shown.

Figure 2:
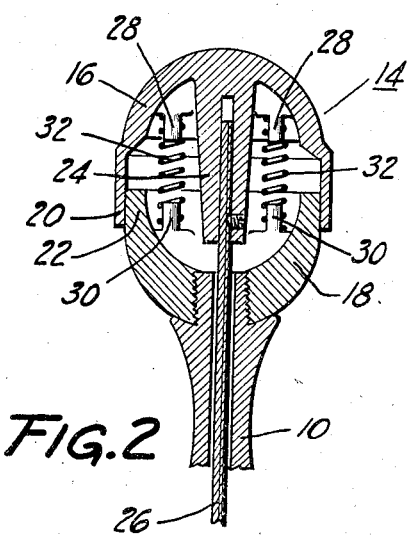
Figure 2 is a sectional view disclosing the details of the control mechanism of my invention; and f Figure 3 discloses, in detail, the connection between the control mechanism of the invention and a part of the clutch operating mechanism disclosed in Figure 1.
Figure 3:
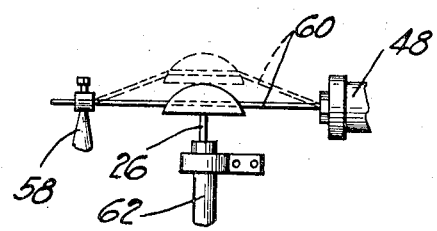

The lever 10 is hollow, as disclosed in Figure 2, the upper end thereof having detachably secured thereto a two-part hollow ball member 14 comprising parts 16 and 18. The rim portion of the part 16 is flared outwardly at 20 to telescopingly receive the peripheral portion 22 of the lower ball part 18. To the central portion of the part 16 is secured a boss 24, projecting inwardly with respect to the part 18. The boss 24 is bored to fixedly receive a flexible operating cable 26 extending through the bore of the lever member 10. Annularly spaced pins 28 extend inwardly from the surface of the ball part 16, said pins being disposed opposite similar pins 30 extending from the inner surface of the ball part 18. Return springs 32 are sleeved over the pins 28 and 30.

The flexible cable 26 is preferably arranged to control the operation of the clutch of the automotive vehicle, and to this end there is provided a power means for operating the clutch. The power means comprises a pressure differential operated motor 34 operably connected to a clutch pedal 36 by a rod 38. The power motor is provided with fluid transmitting means communicating with the intake manifold 40 of an internal-combustion engine 42 by means of conduits 44 and 46. These conduits are interconnected by a three-way valve 48. An accelerator pedal 50 is operably connected to an engine throttle 52 by means of a thrust link 54 and a flexible link 56. The valve 48 is so positioned as to be operated by the accelerator by means of an arm 58 secured to the flexible link 56 and to the valve 48 by a flexible member 60.

The cable 26 extends through a flexible sheath or conduit 62 and is secured at one end to the engine opposite the valve 48 and at the other end to the bottom of lever 10. The cable and sheath together constitute what is known in the art as a Bowden control. Return springs 64 and 66 function respectively to bias the throttle to its closed or engine idling position and to urge the valve 48 to a position to interconnect the manifold 40 and the motor 34 to energize the latter to disengage the clutch.

Referring now to the operation of the above-described mechanism, upon release of the accelerator the spring 64 automatically functions to close the throttle 52, and the spring 66 functions both to return the accelerator to its released or throttle closed position and too perate the valve 48 to connect the manifold 40 with the motor 34, whereupon the motor is energized to disengage the clutch. The control mechanism, comprising the ball 14 and Bowden control, constitutes a means for operating the valve 48 independently of the spring 66, whereby the relative timing of operation of the clutch and transmission may be regulated. In operation, pressure upon the upper ball part 16 by the palm of the hand serves to effect an operating movement of the cable 26 relative to the lever 10.

Figure 1:
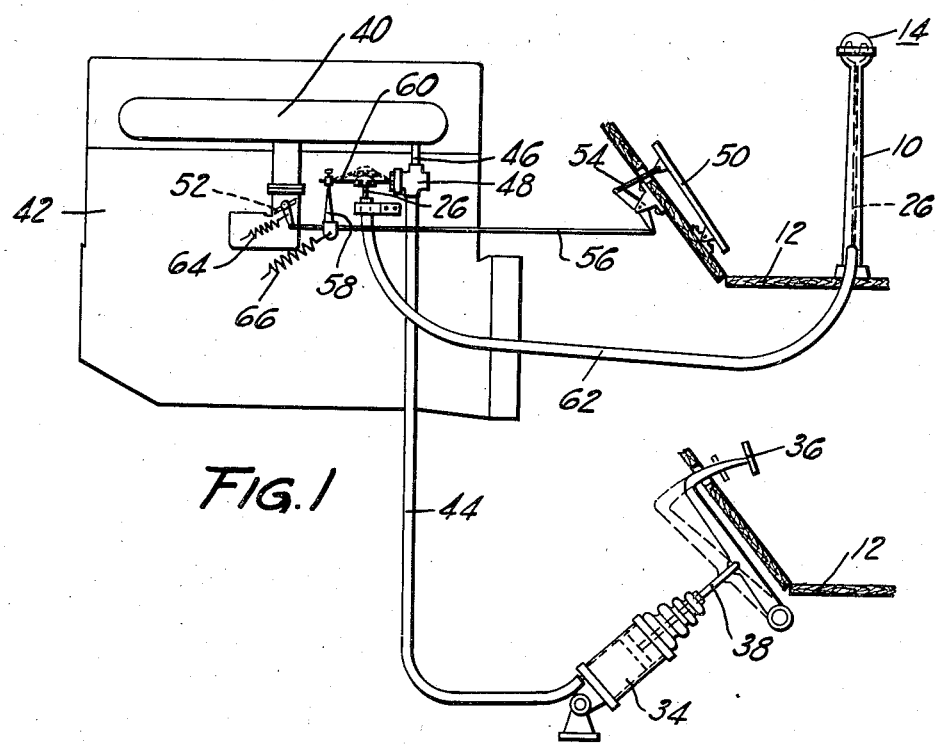
Figure 1 is a diagrammatic view disclosing my invention adapted for use as a control of the transmission and clutch of an automotive vehicle.

The mechanism disclosed in Figure 1 is disclosed and claimed in my Patent No. 2,042,717, dated June 2, 1936, and in my copending application Serial No. 76,031, filed April 23, 1936, the instant application constituting a division of said latter application. However, it will be obvious that the control device of Figure 2 may find other uses than in the operation of mechanisms of the general type disclosed in Figure 1; for example, the cable 26 might be connected directly to the clutch pedal or a linkage connected with the clutch for operating the latter manually. Furthermore, the lever 10 and cable 26 might be employed to operate other controls than the clutch and transmission of an automotive vehicle.

There is thus provided a simple and compact control mechanism, whereby two independent means to be operated may be selectively, intermittently, successively or concurrently operated.

While one illustrative embodiment has been described, it is not my intention to limit the scope of the invention to that particular embodiment, or otherwise than by the terms of the appended claim.

I claim:

A control device for two of the power transmission controls of an automotive vehicle comprising a hollow lever member, a two-part hollow ball member secured to the upper end of said lever member, a flexible operating means secured to one of the parts of said ball and extending through said lever member, pins extending inwardly from the inner face of each of the parts of said ball member, and spring means interposed between and telescoping over the oppositely disposed pins.

VICTOR W. KLIESRATH.